Feb. 25, 1964  J. V. MILO  3,122,159
COUPLING AND VALVE ASSEMBLY
Filed May 28, 1959  2 Sheets-Sheet 1

INVENTOR.
JOSEPH V. MILO
BY
*William A. Zaleski*
ATTORNEY

United States Patent Office 3,122,159
Patented Feb. 25, 1964

3,122,159
COUPLING AND VALVE ASSEMBLY
Joseph V. Milo, 2056 Kay Ave., Union, N.J.
Filed May 28, 1959, Ser. No. 816,419
1 Claim. (Cl. 137—454.2)

My invention relates to check valves of improved design and to a novel method of making such valves, particularly to check valves for use in gasoline pump installations for holding the prime.

There are available today coupling members or fittings which may be of varying lengths for coupling lines into tanks, pumps and other installations. Essentially, they consist of a short length of pipe threaded at each end and having end nuts threaded thereon. The end nuts are provided at one end with internally extending flanges. Between the ends of the pipe and the flanges are positioned gaskets and gasket retainers. When the pipes to be coupled are inserted in the opposite ends of the coupling or fitting, the end nuts are screwed up tight to force the gaskets against the pipes to provide a fluid tight joint. One end of the coupling, if it is on the intake or suction side of a pump, for example, may be coupled to a check valve. This, however, adds length to the intake line where space is at a premium, that is, under the pump.

It would be highly desirable to be able to have both the valve and coupling occupy no more space than the coupling alone and to have a combined coupling and valve which utilizes the standard coupling slightly modified if necessary and a valve assembly which can be readily incorporated in such coupling. This would eliminate the need of a separate valve housing and reduce costs of installation.

Utilizing a coupling and a valve in the intake requires two assemblies plus the labor of connecting two assemblies in any installation. Further, up to the present it has been necessary to cast the valve housing and valve support which of course adds to the cost of the valve.

At present no simple structure has been evolved for making valve assemblies from available materials, such as bar stock and conventional elements.

It is therefore an object of my invention to provide an improved check valve assembly of simple design which utilizes available coupling members or fittings which may be slightly modified and available bar stock.

Another object of my invention is to provide a combined coupling and valve which requires less space and promotes ease of assembly and reduction of assembly time.

A still further object of my invention is to provide a novel and simple valve assembly which utilizes an optimum of stock elements and a novel method of making the same.

In accordance with my invention, I provide a valve assembly either of a cast design or one made from stock parts and which can be inserted within a standard coupling or a coupling slightly modified to be positioned between the pipes being coupled together. In the preferred form of assembly, I provide an insert housing which is machined from bar stock. The upper part of the housing in either case is cylindrical in shape and provided with an O-ring or sealing member intermediate the ends of the cylindrical portion to provide a seal. The cylindrical form insures coaxial registration of the coupling housing and the valve assembly. The valve assembly utilizing stock items, includes a housing formed from bar stock by means of drilling and undercutting to form the housing as will be described in more detail below.

Referring to the drawings.

Figure 1:
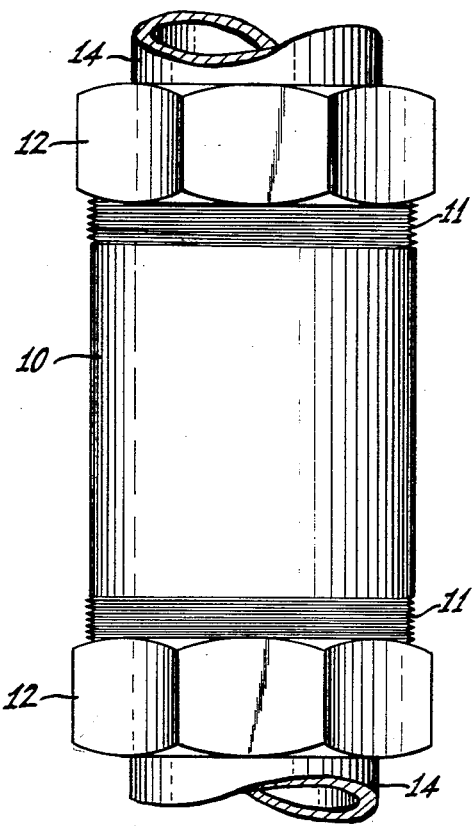
FIG. 1 is a side elevation of a combined coupling and valve assembly made according to my invention.
Figure 2:
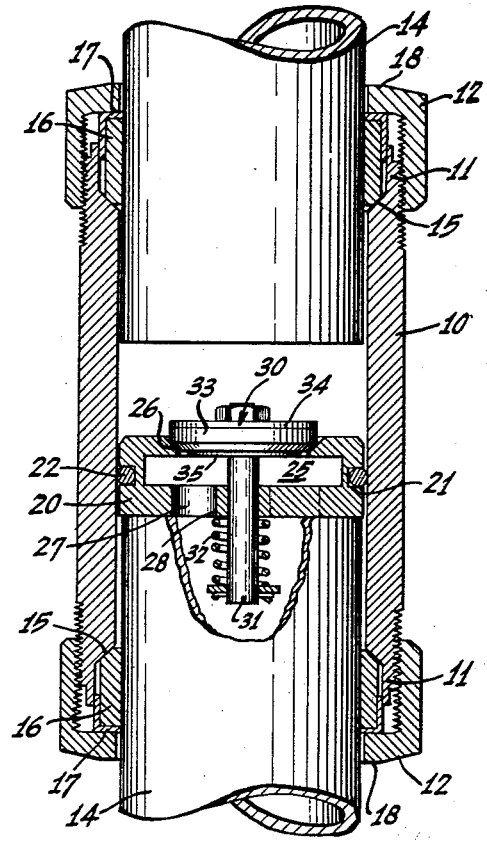
FIG. 2 is a vertical section of FIG. 1 showing details of construction and a valve assembly made according to my invention.

Referring to the drawings, FIGS. 1 and 2, a valve and coupling assembly made according to my invention includes the elongated tubular coupling housing 10 provided at its opposite ends with the threaded portions 11 cooperating with the end nuts 12 threaded thereon and coupled to the conduits 14 received within the opposite ends of the coupling housing. On the inner walls of the threaded portions of the housing recessed bevels 15 are provided which cooperate with the gaskets 16 in contact with retainers 17 engaged by internally extending flanges 18 of the end nuts. When pipes or tubing 14 are received within the end of the housing, the end nuts are drawn up to force the gasket into fluid-tight engagement with the pipes or conduits.

In accordance with my invention, I provide a valve housing assembly including the valve housing 20 of cylindrical form which can be slid into the elongated housing. The pipe 14 received within the elongated housing may serve as a stop member for the valve housing assembly.

The periphery of the housing is provided with a recess 21 on which is mounted the O or sealing ring 22 which extends between the valve housing and the inner wall of the coupling housing. The comparatively short cylindrical housing 20 is provided with a cavity 25. On one side of the housing 20 I provide an opening and valve seat 26. The other surface is provided with a plurality of communicating passages 27 and a valve stem guide and opening support 28.

The valve assembly includes the head 30, stem 31 and biasing spring 32 which is positioned between the lower face of the valve housing and the end of the valve stem to bias the valve to closed position. The sealing ring 33 is retained between the washers 34 and 35.

In operation, when suction is caused above the valve, the valve rises and gasoline or other fluids may flow through the openings 27 and up through the valve seat. When the pump stops operation, the valve, of course, moves to closed position to provide the prime necessary.

Figure 3:
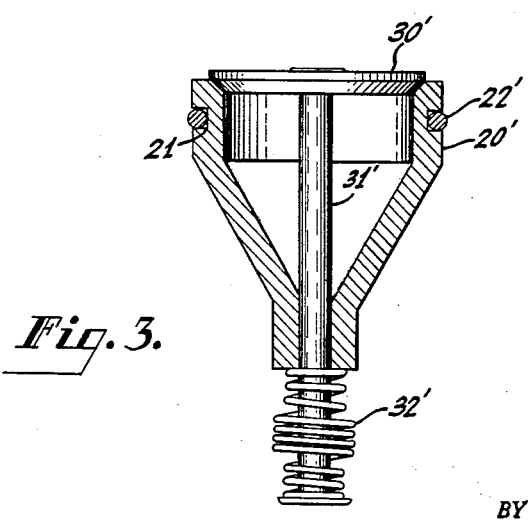
FIG. 3 shows a modified form of the valve assembly shown in FIG. 2.
Figure 4:
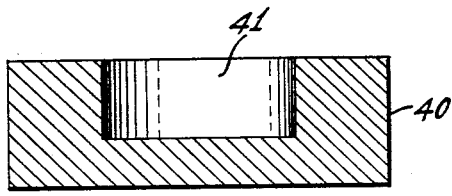
FIG. 4 is a vertical section of a piece of bar stock showing one step of my novel method of forming the insert for the valve assembly.
Figure 5:
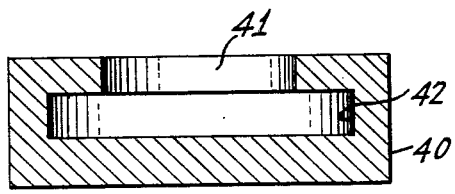
FIGS. 5, 6 and 7 are sections showing further steps in the method of forming the valve housing insert according to my invention.
Figure 6:
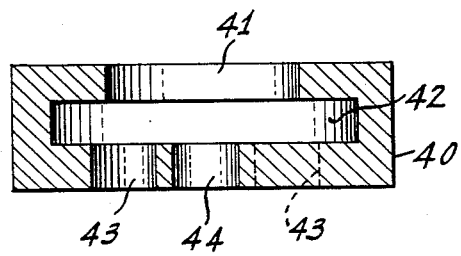
Figure 7:
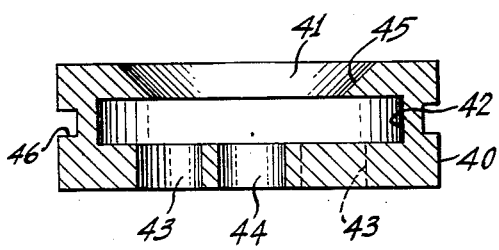

The valve assembly shown in FIG. 3 may be substituted for the valve assembly shown in FIG. 2. The form shown in FIG. 2, however, is preferable. The prime numerals indicate similar parts.

In accordance with my invention, I also provide a novel method of forming a valve housing from bar stock. Referring now to FIGS. 4 to 7, inclusive, bar stock is cut to the desired length to provide a portion 40 having the desired depth for the housing. The first step involves drilling a recess 41 from one face of the stock. The second step, shown in FIG. 5, involves undercutting as shown in 42. Drilling is then followed from the opposite face or side of the member 40 to provide the apertures 43 and the valve stem opening and guide 44. These openings are then followed by a chamfering operation to provide the valve seat 45 and a machine operation to provide the annular recess 46 in which the O ring is provided.

From the above it will be seen that following the teachings of my invention, I am able to utilize a maximum of conventional and available parts to manufacture a combined coupling and valve assembly of simple design, which has all of the advantages pointed out above.

What is claimed is:

A valve and coupling assembly including a coupling sleeve having a cylindrical bore, a pair of pipes having cylindrical ends received in opposite ends of said bore, gaskets interposed between said pipes and sleeve, means for clamping said gaskets in fluid tight relationship with said pipes and sleeve, a check valve in said sleeve intermediate said pipe ends, said check valve having a cylindrical housing member smaller than the minimum internal cross section of said sleeve for movement through either end of said sleeve, said housing member containing an external groove, a resilient annular gasket received in said groove and bearing on the inner wall of said sleeve in fluid tight relationship, a valve seat carried by one end of said housing member, the other end of said housing member containing a plurality of openings, a valve having a stem received in one of said openings and a head having a face engageable with said seat, and a spring bearing on said housing member and valve biasing said face towards said seat.

References Cited in the file of this patent

UNITED STATES PATENTS

| | | |
|---|---|---|
| 383,428 | Messinger | May 22, 1888 |
| 1,631,509 | Baker | June 7, 1927 |
| 1,732,126 | Gardner | Oct. 15, 1929 |
| 1,779,421 | Cox | Oct. 28, 1930 |
| 2,021,745 | Pfefferle | Nov. 19, 1935 |
| 2,063,821 | McKenzie | Dec. 8, 1936 |
| 2,364,864 | Martin | Dec. 12, 1944 |
| 2,669,011 | Brumbaugh | Feb. 16, 1954 |
| 2,771,091 | Baker | Nov. 20, 1956 |
| 2,816,472 | Boughton | Dec. 17, 1957 |
| 2,858,838 | Scaramucci | Nov. 4, 1958 |
| 2,884,002 | Melton | Apr. 28, 1959 |
| 2,942,617 | Gilliam | June 28, 1960 |